US012784477B2

(12) United States Patent
Tsai et al.

(10) Patent No.: US 12,784,477 B2
(45) Date of Patent: Nov. 3, 2026

(54) MEDICAL IMAGE-BASED SYSTEM FOR PREDICTING LESION CLASSIFICATION, AND METHOD FOR USING THEREOF

(71) Applicants: National Cheng Kung University, Tainan (TW); NATIONAL CHENG KUNG UNIVERSITY HOSPITAL, Tainan (TW)

(72) Inventors: Yi-Shan Tsai, Tainan (TW); Yu-Hsuan Lai, Tainan (TW); Cheng-Shih Lai, Tainan (TW); Chao-Yun Chen, Tainan (TW); Meng-Jhen Wu, Tainan (TW); Yi-Chuan Lin, Tainan (TW); Yi-Ting Chiang, Tainan (TW); Peng-Hao Fang, Tainan (TW); Po-Tsun Kuo, Tainan (TW); Yi-Chih Chiu, Tainan (TW)

(73) Assignees: National Cheng Kung University, Tainan (TW); National Cheng Kung University Hospital, Tainan (TW)

( * ) Notice: Subject to any disclaimer, the term of this patent is extended or adjusted under 35 U.S.C. 154(b) by 260 days.

(21) Appl. No.: 18/429,759

(22) Filed: Feb. 1, 2024

(65) Prior Publication Data

US 2025/0037858 A1 Jan. 30, 2025

Related U.S. Application Data

(60) Provisional application No. 63/528,659, filed on Jul. 25, 2023.

(51) Int. Cl.

*G06V 20/69* (2022.01)
*G06T 7/00* (2017.01)
*G06V 10/40* (2022.01)

(52) U.S. Cl.

CPC .......... *G06V 20/698* (2022.01); *G06T 7/0012* (2013.01); *G06V 10/40* (2022.01);
(Continued)

(58) Field of Classification Search

CPC ..... G06V 20/698; G60V 10/40; G06T 7/0012
See application file for complete search history.

(56) References Cited

U.S. PATENT DOCUMENTS

2020/0000396 A1* 1/2020 Madabhushi ........ A61N 5/1039
2020/0113505 A1 4/2020 Clingman et al.
(Continued)

FOREIGN PATENT DOCUMENTS

CN 116416221 A 7/2023

*Primary Examiner* — Kevin Ky
(74) *Attorney, Agent, or Firm* — Troutman Pepper Locke LLP; Tim Tingkang Xia, Esq.

(57) ABSTRACT

The present invention disclose a medical image-based system for predicting lesion classification and a method thereof. The system comprises a feature data extracting module for providing a raw feature data based on a medical image, and a predicting module for outputting a predicted class and a risk index according to the raw feature data. The predicting module comprises a classification unit for generating the predicted class and a prediction score corresponding thereto according to the raw feature data, and a risk evaluation unit for generating the risk index according to the prediction score. The system provides medical personnels a reference score and a risk index to determine progression of a certain disease.

6 Claims, 9 Drawing Sheets

(52) U.S. Cl.
CPC ............... *G06T 2207/10068* (2013.01); *G06T 2207/10072* (2013.01); *G06T 2207/10121* (2013.01); *G06T 2207/30096* (2013.01)

(56) References Cited

U.S. PATENT DOCUMENTS

| | | | | |
|---|---|---|---|---|
| 2022/0068449 | A1 * | 3/2022 | Klassen | G16H 15/00 |
| 2022/0293268 | A1 * | 9/2022 | Nishide | A61B 1/000094 |
| 2022/0399119 | A1 * | 12/2022 | Chen | G06V 10/766 |
| 2023/0274128 | A1 * | 8/2023 | Ross | G06N 3/084<br>706/19 |
| 2025/0037858 | A1 * | 1/2025 | Tsai | G06T 7/0012 |
| 2025/0372264 | A1 * | 12/2025 | Watanabe | G16H 30/20 |

* cited by examiner

MEDICAL IMAGE-BASED SYSTEM FOR PREDICTING LESION CLASSIFICATION, AND METHOD FOR USING THEREOF

CROSS REFERENCE TO RELATED APPLICATION

This application claims the benefit of provisional application Ser. No. 63/528,659, filed Jul. 25, 2023.

FIELD OF THE INVENTION

The invention is related to a medical image analysis system, especially related to a system for predicting lesion classification based on a medical image, and also related to a method using thereof.

BACKGROUND OF THE INVENTION

The incidence of breast cancer is high in the global range, and the prognosis can be improved to a great extent by early detection of the breast cancer. Commonly, non-invasive examination measures for breast cancer screening include molybdenum targets, ultrasound and magnetic resonance, etc. Among the aforementioned examination measures, the ultrasound has the advantages of no radioactivity and low cost, so examination can be easily repeated according to the needs.

The ultrasonic energy allows the acquired images to present clearly-distinguished layers, and improves the accuracy rate of the cystic or solid masses identification. However, with current technologies, the tumor malignancy can only be roughly judged, and further confirmation still requires puncture biopsy.

Besides, even though medical ultrasound is widely deployed in multi-level medical institutions, the difficulty of ultrasound detection remains. To judge a breast cancer nodule malignancy requires the ultrasound image acquisition and on-site reading of a physician simultaneously. Moreover, a physician needs to acquire dynamic images of different sections for further diagnosis, which results that the requirements on the operation technical level and clinical experience of an ultrasonic physician is high. Meanwhile, due to variations of the physicians' scanning maneuvers, patients' individual conditions, and clinical reading experiences of the physicians, misdiagnosis is easily caused.

By using ultrasound, a breast cancer nodule is imaged on the gray-scale map or grades, and their malignancy is then determined based on the gray-scale features of the nodules, such as edge features, echo type, aspect ratio, or other structural features.

The sonographer rates the nodules according to the classification criteria and decides whether to perform further examinations such as follow-up visits or punctures. Currently, a BI-RADS classification method of 2013 edition (American College of Radiology, ACR) is most commonly adopted. The BI-RADS classification method mainly comprises classes 1, 2, 3, 4, 5 and 6, wherein the class 1 is negative; class 2 benign; class 3 benign potential; class 4 suspected malignancy; class 5 highly suspected malignancy; class 6 biopsy-verified malignancy. Generally, the higher the ranking class, the greater the likelihood of malignancy of the nodules detected pathologically by actual surgery.

Some typical benign cases are also classified into class 4 if strictly according to the classification criteria and based on the clinical experience of the sonographer. Nonetheless, the malignancy probability of class 4 ranges from 5 to 95%, so class 4 nodule commonly requires further inspections. Confronting with the uncertainty, class 4 is further sub-classified into three sub-classes 4a, 4b and 4c. Class 4a refers to a palpable and well-defined solid mass, and a 6-month follow up is recommended if the biopsy results are benign; class 4b refers to a mass with partly clear and partly blurred boundaries, if the biopsy result is papilloma, resection surgery shall be considered; class 4c refers to a solid mass with unclear boundaries and irregular shape, which indicates higher probability of progressing into a malignant tumor.

Due to its intrinsic uncertainty, to identify the sub-classes of class 4 requires higher grade of clinical training and experience for a breast cancer physician, and the result of judgement is also unintuitive. With current technology, the detection and classification device for breast cancer nodule can be implemented on the basis of a large number of samples undergoing image segmentation, feature extraction and comparison with benign and malignant classification sample database. Such a device is established on a network structure to perform automatic nodule detection and benign-malignant classification.

At present, a deep learning-based breast nodule automatic detection and hierarchical classification technology is available, but the methodology requires a large number of ultrasonic breast images with nodules, a physician to outline the positions of the nodules as true labels, and image segmentation model trained on all the labeled images. Subsequently, a hierarchical classification model is trained according to the BI-RADS hierarchical data labeled by of the physicians and the position information of the labeled nodules. After the model training is finished, the model can be applied to judge whether the input ultrasound image has nodules based on a segmentation network, and the BI-RADS classification is conducted by using an identification model according to the predicted positions of the nodules and the original image.

Generally, hierarchical classification needs to perform a large amount of calculations when comparing the input image data with the true labels. To achieve higher accuracy of the model predictions, the larger data volume is required, which consequently slows down the operating speed. Moreover, prior technologies takes advantage of deep learning for breast nodule detection and identification. To avoid large data volume, small network structures such as AlexNet and the like are mainly used. With small data volume, conversely, over-fitting problem could be inevitable.

SUMMARY OF THE INVENTION

To address the aforementioned issues of large amount of calculations and over-fit problems owing to small volume of medical images for on-site clinical classification, in one aspect, the present invention provides a medical image-based system for predicting lesion classification, comprising: a feature data extracting module for providing a raw feature data based on a medical image; and a predicting module, connecting to the feature data extracting module for outputting a predicted class and a risk index according to the raw feature data, comprising: a classification unit for generating the predicted class and a prediction score corresponding thereto according to the raw feature data; and a risk evaluation unit for generating the risk index according to the prediction score.

In various embodiments, the predicted class comprises a benign class and a malignant class, and the prediction score comprises a benign score corresponding to a benign class and a malignant score corresponding to the malignant class, wherein a sum of the benign score and the malignant score is 1.

In some embodiments, the risk index is computed based on the distribution of the prediction scores.

In various embodiments, the predicting module further comprises a multi-task modeling unit for training the classification unit based on a preliminary prediction class and a preliminary prediction score output by the classification unit according to the raw feature data, wherein the multi-task modeling unit generates an adjusting parameter according to the preliminary prediction class and the preliminary prediction score, wherein the preliminary prediction class comprises a benign class or a malignant class, and wherein the preliminary prediction score comprises a first preliminary prediction score, a second preliminary prediction score, a third preliminary prediction score, a fourth preliminary prediction score or a combination of two or more thereof.

In some preferred embodiments, the multi-task modeling unit comprises:

a first comparing unit for comparing a first prediction class and a first true class so as to output the first preliminary prediction score;

a second comparing unit for comparing a second prediction class and a second true class so as to output the second preliminary prediction score;

a third comparing unit for comparing a third prediction class and a third true class so as to output the third preliminary prediction score; and a fourth comparing unit for comparing a fourth prediction class, a fourth true class, and a reference class so as to output the fourth preliminary prediction score.

In some preferred embodiments, the multi-task modeling unit further comprises a regression unit for regression analysis of the preliminary prediction class and outputting a regression score, and the multi-task modeling unit generates the adjusting parameter according to the regression score, the first preliminary prediction score, the second preliminary prediction score, the third preliminary prediction score and the fourth preliminary prediction score.

In some preferred embodiments, wherein the benign class comprises a first benign class, a second benign class, a third benign class or a combination thereof, the malignant class comprises a first malignant class, a second malignant class, a third malignant class or a combination thereof, and wherein:

the first prediction class comprises the benign class, and the first true class comprises the malignant class;

the second prediction class comprises the first benign class and the second benign class, and the second true class comprises the third benign class and the malignant class;

the third prediction class comprises the benign class and the first malignant class, and the third true class comprises the second malignant class and the third malignant class; and the fourth prediction class comprises the first benign class, and the fourth true class comprises the second benign class, the third benign class, the first malignant class and the second malignant class, and the reference class comprises the third malignant class.

In some preferred embodiments, the first comparing unit outputs the first preliminary prediction score according to a first cross entropy loss function of the first prediction class and the first true class; the second comparing unit outputs the second preliminary prediction score according to a second cross entropy loss function of a second prediction class and a second true class; the third comparing unit outputs the third preliminary prediction score according to a third cross entropy loss function of a third prediction class and a third true class; and the fourth comparing unit outputs the fourth preliminary prediction score according to a fourth cross entropy loss function of a fourth prediction class, a fourth true class, and a reference class.

In various embodiments, the feature data extracting module further comprises an image segmentation unit for processing the medical image by image segmentation and labeling a region of interest upon the medical image so as to generate an image feature mapping data comprising a plurality of heatmaps comprising a background heatmap, a benign heatmap, a malignant heatmap or a combination thereof, and the raw feature data is extracted from the plurality of heatmaps.

In various embodiments, the image segmentation unit is based on an encoder-decoder architecture comprising Convolutional Neural Networks (CNNs), Autoencoders, Variational Autoencoders (VAEs), Recurrent Neural Networks (RNNs), Long Short-Term Memory (LSTM) Networks, Capsule Networks, Deep Belief Networks (DBNs), Attention Mechanisms, Graph Convolutional Networks (GCNs), Transformers, or the encoder-decoder architecture is a deep learning architecture comprising ResNet, VGGNet, InceptionNet, DenseNet, EfficientNet, Xception, ResNeXt, MobileNet, NASNet, HRNet or ResNeSt.

In various embodiments, wherein the image segmentation unit further performs a segmentation loss function to optimize the region of interest upon the medical image for subsequent lesion classification, wherein the segmentation loss function is performed when comparing the raw image (the medical image) and the plurality of heatmaps output by the encoder-decoder architecture.

In some embodiments, the segmentation loss function comprises an imbalance loss function, a dissimilarity loss function and a boundary loss function.

In various embodiments, the medical image is a lesion image comprising ultrasound image, Magnetic Resonance Imaging (MRI) image, X-ray image, Computed Tomography (CT) image, Positron Emission Tomography (PET) image, Single-Photon Emission Computed Tomography (SPECT) image, Mammograhy image, Endoscopic image, fluoroscopy image or nuclear medicine image.

In various embodiments, the lesion comprises a nodule resulting from breast cancer, lung cancer, thyroid cancer, skin cancer, ovarian cancer, testicular cancer, renal cell carcinoma, pancreatic cancer, colorectal cancer, or lymphoma.

In another aspect, the present invention provides a method for predicting lesion classification based on medical image, comprising:

inputting a raw feature data; and outputting a predicted class, a prediction score and a risk index, wherein the prediction score is output corresponding to the predicted class, and the risk index is generated according to the prediction score.

In various embodiments, the predicted class comprises a benign class and a malignant class, and the prediction score comprises a benign score corresponding to a benign class and a malignant score corresponding to the malignant class, wherein a sum of the benign score and the malignant score is 1.

In various embodiments, the risk index is computed based on the distribution of the prediction scores.

In various embodiments, in a pre-train phase, the method further comprises: outputting a preliminary prediction class and a preliminary prediction score according to the raw feature data; and outputting an adjusting parameter by running a multi-task model according to the preliminary prediction class and the preliminary prediction score, wherein:

the preliminary prediction class comprises a benign class or a malignant class, and wherein the preliminary prediction score comprises a first preliminary prediction score, a second preliminary prediction score, a third preliminary prediction score, a fourth preliminary prediction score or a combination of two or more thereof.

In various embodiments, the running multi-task model comprises:

outputting the first preliminary prediction score by comparing a first prediction class and a first true class;

outputting the second preliminary prediction score by comparing a second prediction class and a second true class;

outputting the third preliminary prediction score by comparing a third prediction class and a third true class; and outputting the fourth preliminary prediction score by comparing a fourth prediction class, a fourth true class, and a reference class.

In some embodiments, the running multi-task modeling unit further comprises:

outputting a regression score by conducting a regression analysis of the preliminary prediction class; and generating the adjusting parameter according to the regression score, the first preliminary prediction score, the second preliminary prediction score, the third preliminary prediction score and the fourth preliminary prediction score.

In some embodiments, the first preliminary prediction score is calculated according to a first cross entropy loss function; the second preliminary prediction score is calculated according to a second cross entropy loss function; the third preliminary prediction score is calculated according to a third cross entropy loss function; the fourth preliminary prediction score is calculated according to a fourth cross entropy loss function.

In certain embodiments, the benign class comprises a first benign class, a second benign class or first benign class, the malignant class comprises a first malignant class, a second malignant class or a third malignant class, and wherein: the first prediction class comprises the benign class, and the first true class comprises the malignant class; the second prediction class comprises the second benign class or the third benign class, and the second true class comprises the third benign class or the malignant class; the third prediction class comprises the benign class or the first malignant class, and the third true class comprises the second malignant class or the third malignant class; and the fourth prediction class comprises the first benign class, and the fourth true class comprises the second benign class, the third benign class, the first malignant class or the second malignant class, and the reference class comprises the third malignant class.

In particular embodiments, the raw feature data is obtained by a method comprising:

inputting a medical image to an encoder-decoder architecture for image feature mapping data; and outputting the image feature mapping data to obtain the raw feature data, wherein the raw feature data comprises a feature map data, a radiomics feature data or a deep learning feature data.

In various embodiments, before inputting the medical image, the medical image is further processed by image segmentation for labeling a region of interest upon the medical image.

In particular embodiments, the image segmentation is performed by using a segmentation loss function comprising an imbalance loss function, a dissimilarity loss function and a boundary loss function.

In various embodiments, the lesion comprises a nodule resulting from breast cancer, lung cancer, thyroid cancer, skin cancer, ovarian cancer, testicular cancer, renal cell carcinoma, pancreatic cancer, colorectal cancer, or lymphoma.

The system provided in the present invention allows simulation of human image classification judgement process, and provides a more precise interpretation to distinguish high-risk lesions and low-risk lesions. The system is also applicable for multi-level accurate classification in medical image analysis such as ultrasound, MRI, CT or PET images.

The system provided in the present invention, based on feature maps and loss function calculations, can reduce the large amount of calculations required for learning image feature values in the prior arts, and thus fast and efficient image analysis can be achieved.

The system provided in the present invention allows one-click analysis, and prediction result is present in a simple manner, which saves time of consulting physicians for reading image analysis results. When faced with hierarchical judgments such as judging malignancy of a breast nodule according to BIRADS standards, the system provided in the present invention can still maintain high-accuracy when test datasets are collected from other medical institutions.

EMBODIMENTS OF THE INVENTION

Please refer to FIGS. 1*a* to 1*d* illustrating the first embodiment of a medical image-based system (100) for predicting lesion classification disclosed in the present invention, the system (100) comprises a feature data extracting module (1*a*) for providing a raw feature data based on a medical image, and a predicting module (1*b*) connecting to the feature data extracting module (1*a*) for outputting a predicted class and a risk index according to the raw feature data.

Figure 1A:
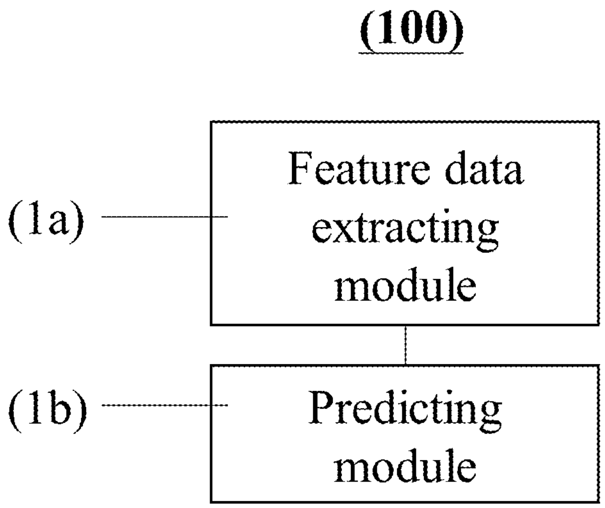
FIG. 1*a* is a block chart to illustrate the medical image-based system for predicting lesion classification in an inference phase.
Figure 1B:
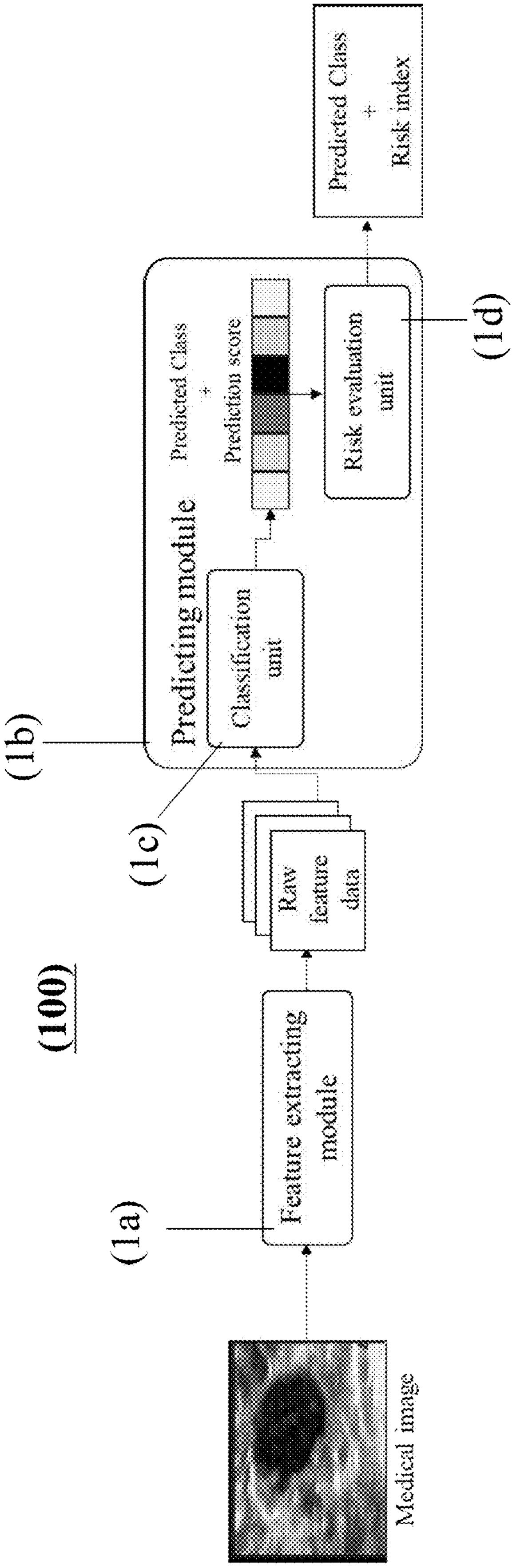
FIG. 1*b* is a cartoon to illustrate working pipeline of the medical image-based system for predicting lesion classification to output the predicted class and the risk index.

In the first embodiment, as shown in FIGS. 1*a* to 1*b*, the predicting module (1*b*) comprises a classification unit (1*c*) and a risk evaluation unit (1*d*); the classification unit (1*c*) generates the predicted class and a prediction score corresponding thereto according to the raw feature data; the risk evaluation unit (1*d*) generates the risk index according to the prediction score.

The predicted class comprises a benign class and a malignant class, and the prediction score comprises a benign score corresponding to a benign class and a malignant score corresponding to the malignant class, wherein a sum of the benign score and the malignant score is 1.

The risk index is computed based on the distribution of the prediction scores.

In the first embodiment, the lesion can be a nodule resulting from breast cancer, lung cancer, thyroid cancer, skin cancer, ovarian cancer, testicular cancer, renal cell carcinoma, pancreatic cancer, colorectal cancer, or lymphoma; in particular examples, the lesion is a nodule resulting from breast cancer.

In particular examples, the benign class comprises a first benign class, a second benign class or a third benign class, and the malignant class comprises a first malignant class, a second malignant class or a third malignant class; the raw feature data can be extracted from a medical image of a lesion such as a breast cancer nodule at an unknown progression stage.

Exemplarily, the lesion is a nodule resulting from breast cancer, and currently breast cancer nodule can be categorized to be benign or malignant according to standards reported in Breast Imaging-Reporting and Data System (BI-RADS). BI-RADS assessment categories are listed in Table 1a.

TABLE 1a

| Category | Assessment |
|---|---|
| 0 | Incomplete |
| 1 | Negative |
| 2 | Benign |
| 3 | Probably benign |
| 4 | Suspicious |
| 5 | Highly suggestive of malignancy |
| 6 | Known biopsy - proven malignancy |

In one particular example, the system (100) is designed to simulate image judgement process similar to medical personnels, and thus further categorize the suspicious category 4 into three sub-categories as 4a, 4b and 4c so that the system simulates the judgement process of medical personnels. Correspondingly, the first benign class can be denoted as category 2, the second benign class is denoted as category 3, the third benign class is denoted as category 4a, the first malignant class is denoted as category 4b, the second malignant class is denoted as category 4c, and the third malignant class is denoted as category 5.

In the aforesaid example, as shown in FIG. 1*b*, by feeding the system (100) a breast nodule image, the system (100) outputs the predicted classes and the corresponding prediction scores as indicated in Table 1b; in this case, the predicted class with the highest prediction score is category 4a (0.843), and the risk index 0.432 is computed based on the distribution of the prediction scores, which would fall into one of the corresponding reference intervals. Furthermore, for better interpretate, we can convert the risk index into probability of malignant according to the definition of BIRADS.

TABLE 1b

| predicted class | | prediction score | Risk index | Reference index | Probability of Malignant |
|---|---|---|---|---|---|
| Benign class | 2 | 0.031 | — | 0.0~0.1 | 0 |
| | 3 | 0.034 | — | 0.1~0.3 | 0~0.02 |
| | 4a | 0.843 | 0.432 | 0.3~0.5 | 0.02~0.10 |
| Malignant class | 4b | 0.073 | — | 0.5~0.7 | 0.10~0.50 |
| | 4c | 0.012 | — | 0.7~0.9 | 0.50~0.95 |
| | 5 | 0.007 | — | 0.9~1.0 | 0.95~1.00 |

In the first embodiment, the medical image can be a lesion image acquired by imaging technologies such as ultrasound, Magnetic Resonance Imaging (MRI), X-ray, Computed Tomography (CT), Positron Emission Tomography (PET), Single-Photon Emission Computed Tomography (SPECT), Mammograhy, Endoscopic, fluoroscopy or nuclear medicine; in particular examples, the medical image is acquired by ultrasound.

Figure 1C:
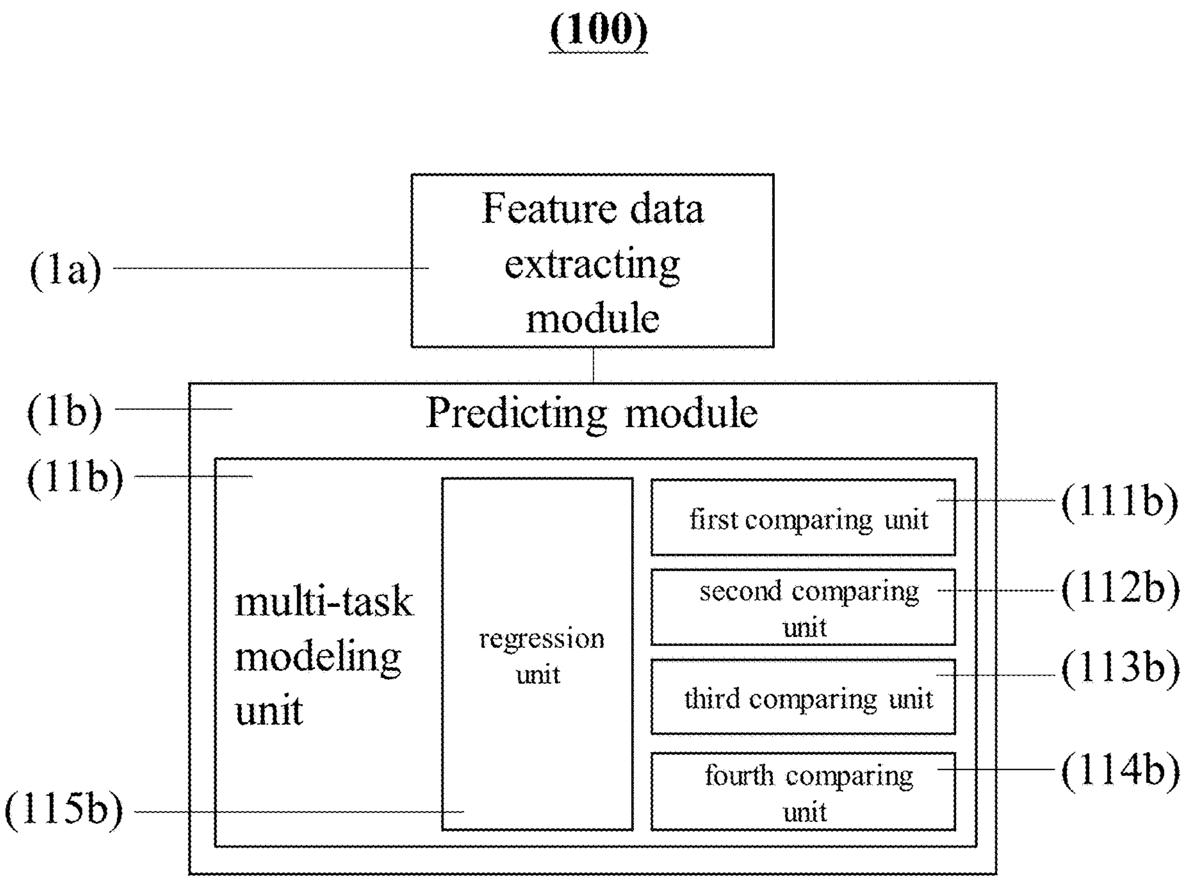
FIG. 1*c* is a block chart to illustrate the medical image-based system for predicting lesion classification in a pre-training phase.
Figure 1D:
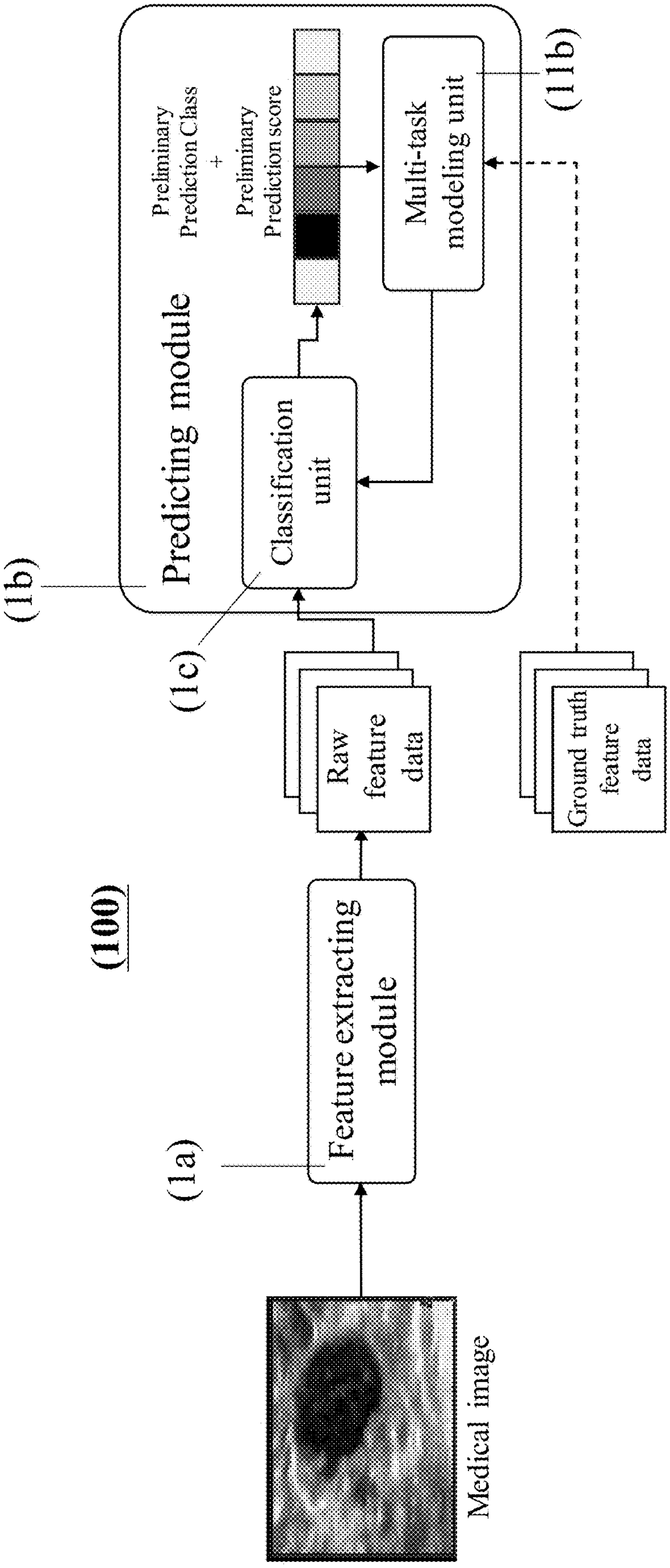
FIG. 1*d* is a cartoon to illustrate working pipeline of pre-training of the medical image-based system for predicting lesion classification.

In the first embodiment, as shown in FIGS. 1*c* to 1*d*, the classification unit (1*c*) is pre-trained by a multi-task modeling unit (11*b*) based on a preliminary prediction class and a preliminary prediction score output by the classification unit (1*c*) according to the raw feature data, wherein the multi-task modeling unit (11*b*) generates an adjusting parameter according to the preliminary prediction class and the preliminary prediction score.

To train the classification unit (1*c*) for precisely classifying the raw feature data to the predicted class that is closest to a ground truth class; the preliminary prediction class, corresponding to the predicted class, comprises a benign class or a malignant class, and for further calculating and assessing the similarity of the preliminary prediction class to the ground truth class, the preliminary prediction score comprises a first preliminary prediction score, a second preliminary prediction score, a third preliminary prediction score, a fourth preliminary prediction score or a combination of two or more thereof.

Please continue to refer to FIGS. 1*c* to 1*d*, the predicting module (1*b*) generates the adjusting parameter by running a multi-task modeling unit (11*b*) according to the raw feature data and a ground truth feature data, wherein the multi-task modeling unit (11*b*) comprises:

a first comparing unit (111*b*) for comparing a first prediction class and a first true class so as to output a first preliminary prediction score;

a second comparing unit (112*b*) for comparing a second prediction class and a second true class so as to output a second preliminary prediction score;

a third comparing unit (113*b*) for comparing a third prediction class and a third true class so as to output a third preliminary prediction score;

a fourth comparing unit (114*b*) for comparing a fourth prediction class, a fourth true class, and a reference class so as to output a fourth preliminary prediction score, and the multi-task modeling unit (11*b*) generates the prediction result according to the first preliminary prediction score, the second preliminary prediction score, the third preliminary prediction score and the fourth preliminary prediction score.

In the first embodiment, the first comparing unit (111*b*) performs a first cross entropy loss function so as to output the first preliminary prediction score; the second comparing unit (112*b*) performs a second cross entropy loss function so as to output the second preliminary prediction score; the third comparing unit (113*b*) performs a third cross entropy loss function so as to output the third preliminary prediction score; the fourth comparing unit (114*b*) performs a fourth cross entropy loss function so as to output the fourth preliminary prediction score.

Before the multi-task modeling unit (11*b*) generates the adjusting parameter according to the first preliminary prediction score, the second preliminary prediction score, the third preliminary prediction score and the fourth preliminary prediction score, the multi-task modeling unit (11*b*) performs the first cross entropy loss function, the second cross entropy loss function, the third cross entropy loss function, and the fourth cross entropy loss function separately or simultaneously so as for assessment of discrete probability distribution of each prediction class and each true class.

Each of the true classes can be output by the classification unit based on a ground truth feature data, wherein the ground truth feature data is previously labeled the benign class or the malignant class by personnels specialized at medical sonography.

The raw feature data can be acquired through image processing of the medical image by technologies known in the art. In the present invention, the raw feature data can be feature maps having highlighted regions of interest or quantitative feature data such as radiomics data.

In various embodiments, the raw feature data can be a feature map data, a radiomics feature data or a deep learning feature data, but not limited to this.

Features of the medical image variates depending on algorithm designs and feature detection methods. Specific features include points, shapes, textures, and colors, but not limited to this. For example, the raw feature data are extracted from the medical image using software such as Pyradiomics suite, GUI-based radiomics extractor PyRadGUI, DICOMautomaton, or deep learning-based Radiomics-Features-Extractor, but not limited to this. Some of the image feature variables are inevitably missing, so this part of the image feature variable values can be ignored in subsequent procedures.

In the first embodiment, the first cross entropy loss function is performed to obtain a first discrete probability distribution value L1 so as to be the first preliminary prediction score. The first preliminary prediction score is to evaluate that the loss value when the preliminary prediction class is the benign class or the malignant class on condition that the first true class is the malignant class, and the first prediction class comprises the benign class; particularly, the first cross entropy loss function is performed according to the following formula:

$$L1=\text{CrossEntropy}(\{\text{the benign class}\},\{\text{the malignant class}\})$$

When the benign classification is a ternary classification problem, the benign class can be the first benign class, the second benign class or the third benign class, and the malignant class is a first malignant class, a second malignant class or a third malignant class, and the first cross entropy loss function is performed according to the following formula:

$$L1=\text{CrossEntropy}(\{2,3,4a\},\{4b,4c,5\})$$

The second cross entropy loss function is performed to obtain a second discrete probability distribution value L2 so as to be the second preliminary prediction score. The second preliminary prediction score is to evaluate the loss value when the preliminary prediction class is the second benign class or the third benign class on condition that the second true class is the third benign class or the malignant class; particularly, the second cross entropy loss function is performed according to the following formula:

$$L2=\text{CrossEntropy}(\{\text{the second benign class or the third benign class}\},\{\text{the third benign class or the malignant class}\})$$

The benign classification is a binary classification problem, and the second true class is the third benign class or the malignant class, wherein the malignant class can be the first malignant class, the second malignant class or the third malignant class, and the second cross entropy loss function is performed according to the following formula:

$$L2=\text{CrossEntropy}(\{2,3\},\{4a,4b,4c,5\})$$

The third cross entropy loss function is performed to obtain a third discrete probability distribution value L3 so as to be the third preliminary prediction score. The third preliminary prediction score is to evaluate the loss value when the preliminary prediction class is the benign class or the first malignant class on condition that the third true class is the second malignant class or the third malignant class; particularly, the third cross entropy loss function is performed according to the following formula:

$$L3=\text{CrossEntropy}(\{\text{the benign class or the first malignant class}\},\{\text{the second malignant class or the third malignant class}\})$$

The benign classification is a quaternary classification problem, and the third prediction class is the first benign class, the second benign class, the third benign class or the first malignant class, and the second cross entropy loss function is performed according to the following formula:

$$L3=\text{CrossEntropy}(\{2,3,4a,4b\},\{4c,5\})$$

The fourth cross entropy loss function is performed to obtain a fourth discrete probability distribution value L4 so as to be the fourth preliminary prediction score. The fourth preliminary prediction score is to evaluate the loss value when the preliminary prediction class is the first benign class on condition that the fourth true class is the second benign class, the third benign class, the first malignant class or the second malignant class, the reference class is the third malignant class; particularly, the fourth cross entropy loss function is performed according to the following formula:

$$L4=\text{CrossEntropy}(\{2\},\{3,4a,4b,4c\},\{5\})$$

In addition to obtaining all the discrete probability distribution values including L1 to L4, the multi-task modeling unit (11*b*) further comprises a regression unit (115*b*) for regression analysis of the preliminary prediction class and outputting a regression score, and the multi-task modeling unit (11*b*) converging the regression score, the first preliminary prediction score, the second preliminary prediction score, the third preliminary prediction score and the fourth preliminary prediction score into the prediction score.

The multi-task modeling unit (11*b*) conducts a regression loss analysis on the preliminary prediction class, determining whether the preliminary prediction class truly belongs to the benign class or the malignant class, and outputs a regression value ($L_{regression}$); the multi-task modeling unit (11*b*) then sum up the first preliminary prediction score, the second preliminary prediction score, the third preliminary prediction score and the fourth preliminary prediction score and the regression loss value into a total loss (L) as the prediction score according to the following formula:

$$L = L_{regression} + L1 + L2 + L3 + L4$$

The prediction score is then read by the multi-task modeling unit for evaluating the confidence of the preliminary prediction class assigned to the raw feature data, and output the prediction score as the predicted result.

Figure 2A:
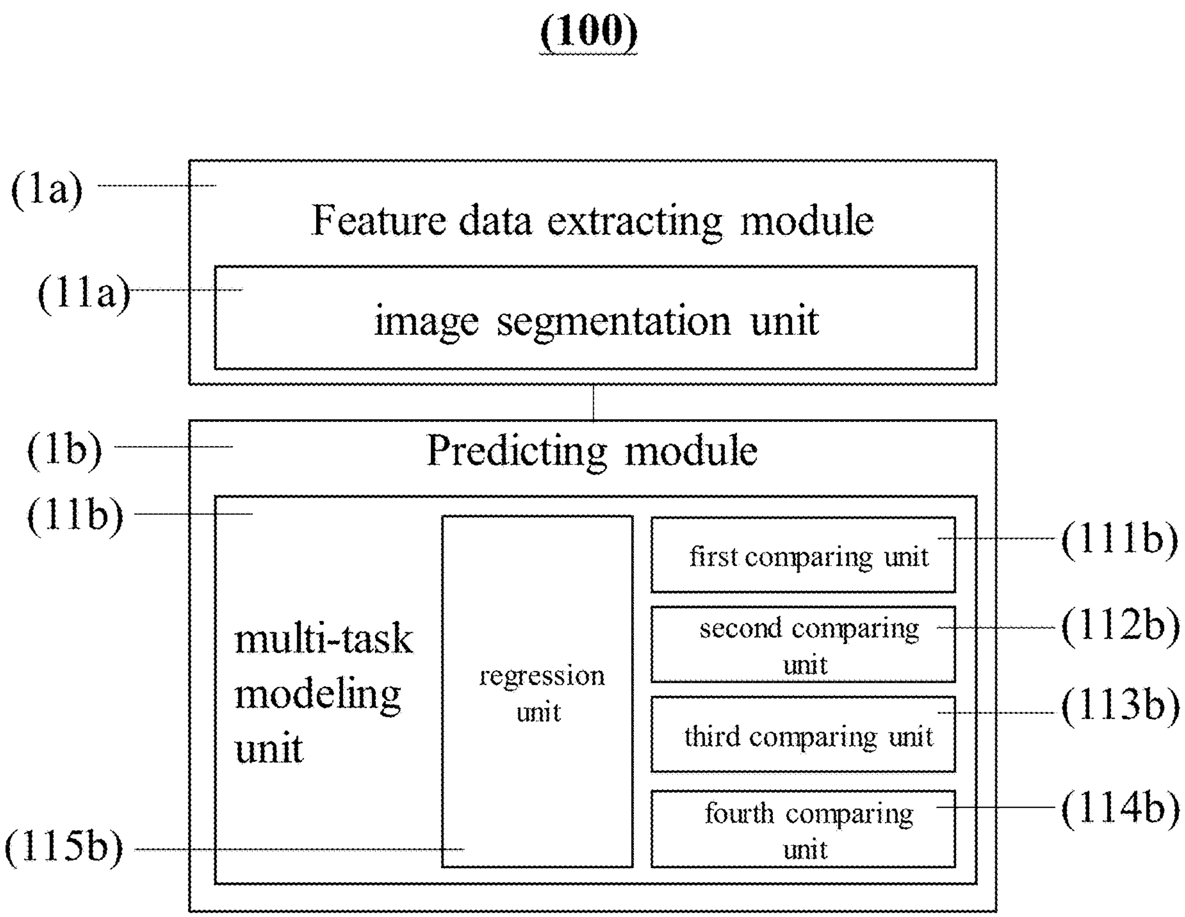
FIG. 2*a* is a block chart to illustrate the medical image-based system for predicting lesion classification having image segmentation unit.

In the second embodiment, please refer to FIG. 2*a*, the system (100) includes all technical features of the first embodiment, and the feature data extracting module (1*a*) further comprises an image segmentation unit (11*a*) for processing the medical image by image segmentation for labeling a region of interest upon the medical image.

In some examples, the image segmentation unit is based on an encoder-decoder architecture for receiving the medical image so as to generate an image feature mapping data, and outputting the image feature mapping data to obtain the raw feature data; the image feature mapping data output by the encoder-decoder architecture comprises a plurality of heatmaps representing a background heatmap, a benign heatmap, a malignant heatmap or a combination thereof. In specific examples, image features are extracted from the plurality of heatmaps and output in a format of feature map having region of interest thereupon or a format of quantitative radiomics data.

The raw feature data can also be extracted from the plurality of heatmaps image using software such as Pyradiomics suite, GUI-based radiomics extractor PyRadGUI, DICOMautomaton, or deep learning-based Radiomics-Features-Extractor, but not limited to this, and the raw feature data is output in a format of radiomics feature dataset. Some of the image feature variables are inevitably missing, so this part of the image feature variable values will be ignored in subsequent procedures.

The encoder-decoder architecture can be exemplified by Convolutional Neural Networks (CNNs), Autoencoders, Variational Autoencoders (VAEs), Recurrent Neural Networks (RNNs), Long Short-Term Memory (LSTM) Networks, Capsule Networks, Deep Belief Networks (DBNs), Attention Mechanisms, Graph Convolutional Networks (GCNs), Transformers, or the encoder-decoder architecture can be exemplified by a deep learning architecture such as ResNet, VGGNet, InceptionNet, DenseNet, EfficientNet, Xception, ResNeXt, MobileNet, NASNet, HRNet or ResNeSt.

Figure 2B:
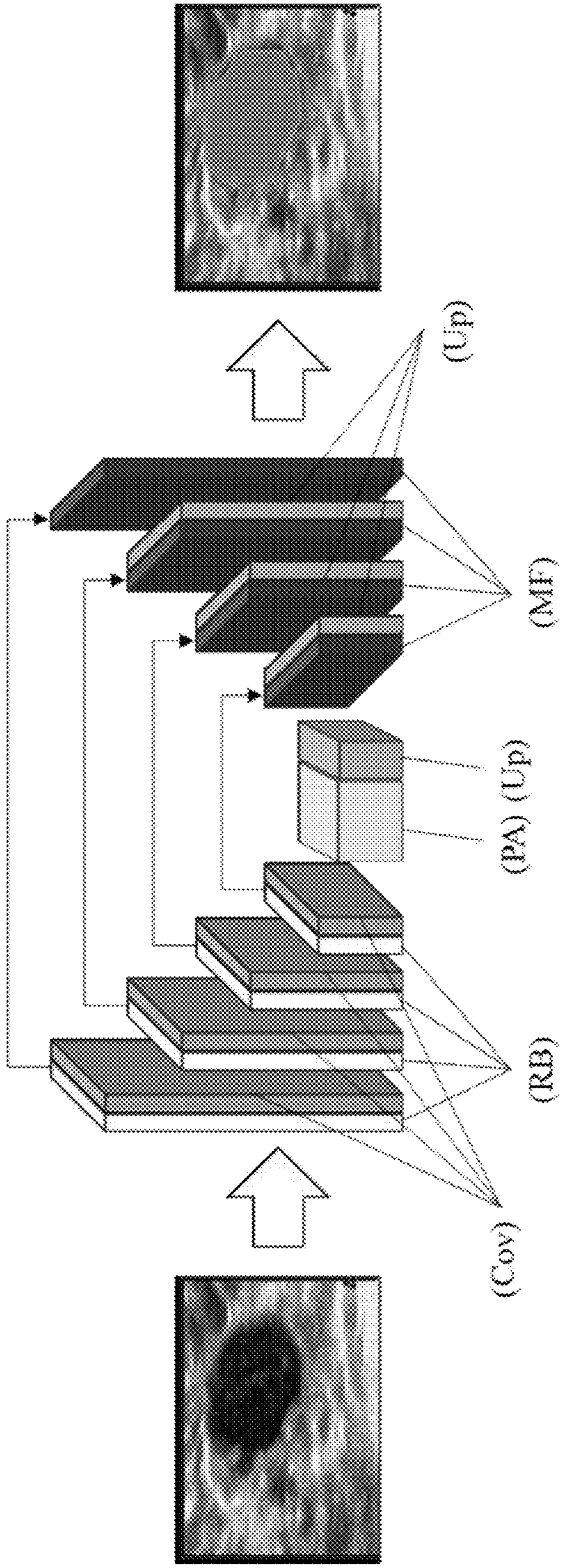
FIG. 2*b* is a cartoon to illustrate architecture of the image segmentation unit.

In particular examples, the size of layers in a ResNet-based encoder-decoder architecture is modified to fit our raw feature data generation task. FIG. 2*b* shows the architecture of the ResNet-based encoder-decoder architecture for our raw feature data generation task, including the name and size of each layer.

The ResNet-based encoder-decoder architecture comprises the following 5 parts:

(1) the fundamental building block of the ResNet-based encoder-decoder architecture (denoted by RB); to minimize the problem of vanishing gradient 3×3 Conv blocks and one residual connection to capture high-dimensional feature information of the medical image, such as an ultrasound image of breast cancer nodule. Batch Normalization in prior design is replaced with group normalization in the Res-block of the ResNet-based encoder-decoder architecture;

(2) the convolutional layers with 2 strides for down-sampling the medical image through multiple 3×3 convolution kernels (denoted by Cov) so as to reduce the number of parameters and dimensions, and improves performance of the ReNet-based encoder-decoder architecture;

(3) the up-sampling layer for recovering the size of the image feature mapping data that are down-sampled (denoted by Up);

(4) the Position-wise Attention Block (PAB) to obtain the spatial dependencies between pixels in feature maps by a self-attention mechanism manner (denoted by PA);

(5) the Multi-scale Fusion Attention Block (MFAB) to capture the channel dependencies between any feature maps by applying attention mechanism (denoted by MF), and wherein the MFAB extracts the interdependence among feature channels via combining the high and low-level feature maps generated from the medical image.

In the third embodiment, the system (100) includes all technical features of the second embodiment, and the image segmentation unit (11*a*) further performs a segmentation loss function to optimize the region of interest upon the medical image for subsequent lesion classification. Particularly, the segmentation loss function is performed when comparing the raw image (the medical image) and the plurality of heatmaps output by the encoder-decoder architecture. The segmentation loss function comprises an imbalance loss function, a dissimilarity loss function and a boundary loss function, in one particular example, the region of interest upon the medical image is adjusted by the segmentation loss function according to the following formula:

$$L_{seg} = \alpha \cdot ImbalanceLoss + \beta \cdot DissimilarityLoss + (1 - \alpha - \beta) \cdot$$

BoundaryLoss

Wherein α and β represent constants between 0 to 1, and α and β are hyperparameters and can be determined depending on user's need.

In the third embodiment, the imbalance loss function is a Focal Tversky Loss function according to the following formula:

$$FocalTverskyLoss(p) = \frac{1}{3}\sum_c \left(1 - \frac{\sum_{i,j} p_{c,i,j} g_{c,i,j}}{\sum_{i,j}(\alpha \cdot (1 - g_{c,i,j}) p_{c,i,j} + b \cdot g_{c,i,j}(1 - p_{c,i,j}) + p_{c,i,j} g_{c,i,j}}\right)^{0.75}$$

wherein i and j are index of output pixel; c is an index of output channels; $p_{c,i,j}$ represents the model output; $g_{c,i,j}$ represent ground truth; a and b are hyperparameters and they are non-negative constants on condition that a+b=1.

In the third embodiment, the dissimilarity loss function is a Cross Entropy function according to the following formula:

$$CrossEntropy(p) = \frac{1}{3}\sum_c BCE(p_c, g_c)$$

BCE is a binary cross entropy function, while $p_c$ represents model output, and $g_c$ represents ground truth.

In the third embodiment, the boundary loss function is according to the following formula:

$$BoundaryLoss(p) = \int_{P-G} D(x, \partial G)dx - \int_{P\cap G} D(x, \partial G)dx$$

Wherein $p \in [0,1]^{3\times768\times1024}$ is the softmax output of the model and $P=\{(i,j)|\mathrm{argmin}_c(p_{c,i,j})=0\}$ is the predicted region of nodules. Similarly, g is the corresponding truth segmentation of the nodule, and G is its interior. $D(x, \partial G)$ is the least distance between point x and the points on the boundary $\partial G$.

In various embodiments, a medical personnel can evaluate precision of the preliminary prediction class assigned to the raw feature data according to the predicted result. Before initiating the system (100), a medical image dataset having medical images labeled with multiple classes can be fed to the system (100) to train the prediction module (1*b*), and the system (100) can be tuned according to the prediction score output by the multi-task modeling unit (11*b*). For example, the training dataset can be ultrasound images from patients who have been diagnosed to have breast cancer nodules classified based on BI-RADS standards, and the diagnosis depends on manual nodule labeling by medical personnels and biopsy analysis. The medical image dataset can be divided into a testing dataset and a training dataset. The data volume ratio can be 1:(1 to 10), but not limited to this. Validation of preciseness and confidence of automated image segmentation depends on the total loss (L) calculated by the multi-task modeling unit (11*b*). A threshold value of the total loss can be determined during the above training phase, and the prediction module (11*b*) will be trained to evaluate confidence of the preliminary prediction class assigned to a randomly input medical image according to the threshold value.

Figure 3:
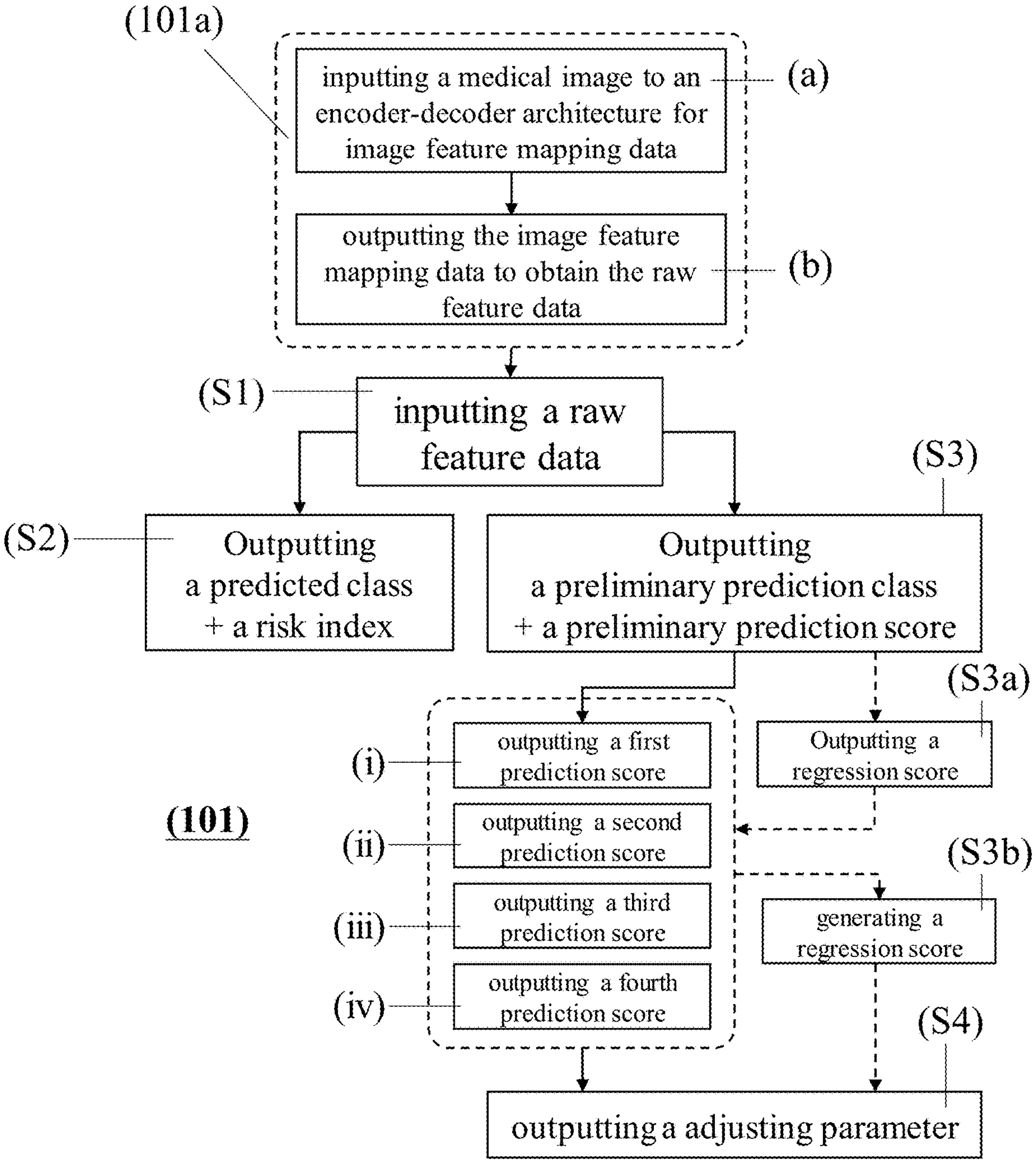
FIG. 3 is a flowchart to illustrate method for predicting lesion classification based on the medical image.

Please refer to FIG. 3 illustrating the fourth embodiment providing a method (101) for predicting lesion classification based on medical image. The method can be conducted based on the system (100) according to the first to the third embodiments.

The method (101) comprises the following steps:

Step (S1): inputting a raw feature data;

Step (S2): outputting a predicted class, a prediction score and a risk index, wherein the prediction score is output corresponding to the predicted class, and the risk index is generated according to the prediction score.

In the fourth embodiment, in a pre-train phase, the method (101) further comprises steps of:

Step (S3): outputting a preliminary prediction class and a preliminary prediction score according to the raw feature data; and Step (S4): outputting an adjusting parameter by running a multi-task model according to the preliminary prediction class and the preliminary prediction score, wherein the preliminary prediction class comprises a benign class or a malignant class, and wherein the preliminary prediction score comprises a first preliminary prediction score, a second preliminary prediction score, a third preliminary prediction score, a fourth preliminary prediction score or a combination of two or more thereof.

Exemplarily, in Step (S3), the running multi-task model comprises the following steps (i) to (iv):

(i) outputting a first preliminary prediction score by comparing a first prediction class and a first true class;

(ii) outputting a second preliminary prediction score by comparing a second prediction class and a second true class;

(iii) outputting a third preliminary prediction score by comparing a third prediction class and a third true class; and (iv) outputting a fourth preliminary prediction score by comparing a fourth prediction class, a fourth true class, and a reference class.

In the fourth embodiment, the running multi-task modeling unit further comprises the following steps (S3a) to (S3b):

Step (S3a): outputting a regression score by conducting a regression analysis of the preliminary prediction class; and Step (S3b): generating the adjusting parameter according to the regression score, the first preliminary prediction score, the second preliminary prediction score, the third preliminary prediction score and the fourth preliminary prediction score.

In the fourth embodiment, the first preliminary prediction score is calculated according to a first cross entropy loss function; the second preliminary prediction score is calculated according to a second cross entropy loss function; the third preliminary prediction score is calculated according to a third cross entropy loss function; the fourth preliminary prediction score is calculated according to a fourth cross entropy loss function.

Before the prediction score is generated, the first cross entropy loss function, the second cross entropy loss function, the third cross entropy loss function, and the fourth cross entropy loss function are performed separately or simultaneously so as for assessment of discrete probability distribution of each prediction class and each true class.

In particular examples, the benign class comprises a first benign class, a second benign class or a third benign class, and the malignant class comprises a first malignant class, a second malignant class or a third malignant class; the raw feature data can be extracted from a medical image of a lesion such as a breast cancer nodule at an unknown progression stage. In one specific example, the first benign class can be denoted as category 2, the second benign class is denoted as category 3, the third benign class is denoted as category 4a, the first malignant class is denoted as category 4b, the second malignant class is denoted as category 4c, and the third malignant class is denoted as category 5 according to BI-RADS standards.

In the fourth embodiment, performing the first cross entropy loss function, the second cross entropy loss function, the third cross entropy loss function and the fourth cross entropy loss function separately or simultaneously in order to obtain discrete probability distribution values including L1, L2, L3 and L4 follows formula as described in the first embodiment, and will not be elaborated here.

In the Step (S3), In addition to obtaining all the discrete probability distribution values including L1 to L4, a regression loss analysis of the preliminary prediction class is further performed to output a regression score, and then converging the regression score, the first preliminary prediction score, the second preliminary prediction score, the third preliminary prediction score and the fourth preliminary prediction score into the prediction score.

The regression loss analysis is conducted according to the preliminary prediction class, determining whether the preliminary prediction class truly belongs to the benign class or the malignant class, and outputs a regression value ($L_{regres}$-

$_{sion}$); then summing up the first preliminary prediction score, the second preliminary prediction score, the third preliminary prediction score and the fourth preliminary prediction score and the regression loss value into a total loss (L) as the prediction score according to the following formula:

$$L = L_{regression} + L1 + L2 + L3 + L4$$

Finally, in the Step (S4), the prediction score is output as the predicted result for evaluating the confidence of the preliminary prediction class assigned to the raw feature data.

Please refer to FIG. 3, before Step (S1), the method (101) further comprises a raw feature data generation process (101*a*) based on the image segmentation unit (11*a*). The raw feature data generation process (101*a*) comprises the following steps:

Step (a): inputting a medical image to an encoder-decoder architecture for image feature mapping data; and Step (b): outputting the image feature mapping data to obtain the raw feature data.

Example 1

Figure 4:
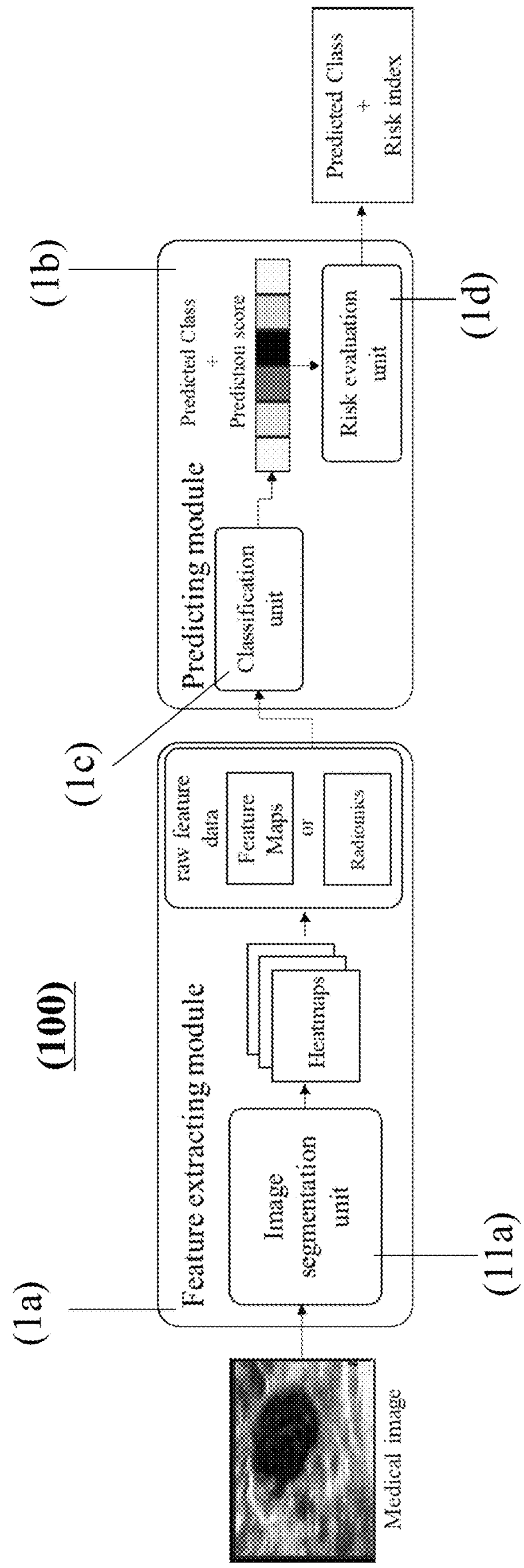
FIG. 4 is a cartoon to illustrate pipeline of the method for predicting lesion classification based on medical image in example 1.

In example 1, the system (100) according to the first embodiment was applied for evaluating image segmentation in consideration of sensitivity and specificity; the pipeline to execute the system (100) can also be referred to FIG. 4. In Example 1, the raw data was segmented in a ResNet-based network of the feature extracting module (1*a*), and each image of the test dataset was processed to output a plurality of heatmaps representing a background heatmap, a benign heatmap and a malignant heatmap.

The raw image as well as the heatmaps were further processed by a ResNest-based feature data extracting module (1*a*) for outputting feature maps or radiomics feature datasets as the raw feature data corresponding to the raw image were for subsequent classification. After being assigned of a preliminary prediction class, the raw feature data then underwent regression loss and cross entropy calculation so as to output a total loss. The total loss was then used to determine whether the preliminary prediction class to be confident or not, and subsequently being output as prediction result indicating whether the raw image is classified as benign or malignant.

Example 2

In example 2, the input datasets including a test dataset and a valid dataset were output by image enhancement through a V6-CLAHE model, and processed by the system (100) according to the pipeline illustrated in the example 1. The test dataset has a size of 188 ultrasound images from patients having breast cancer nodules, and the nodules were about to be classified. The valid dataset has a size of 186 ultrasound images from patients having breast cancer nodules that had been validated based on biopsy analysis. The datasets were fed to the system (100) according to the first embodiment. Please refer to Table 1c, the test dataset after image segmentation showed high sensitive and specificity when regions of interest are compared to those of the valid dataset, TABLE 1c

| | | Background | | Benign | | Malignant | |
|---|---|---|---|---|---|---|---|
| Dataset | Mean Dice | Sensitive | Specificity | Sensitive | Specificity | Sensitive | Specificity |
| Valid | 0.941 | 0.999 | 1.000 | 0.803 | 0.825 | 0.810 | 0.834 |
| Test | 0.940 | 0.999 | 1.000 | 0.741 | 0.807 | 0.819 | 0.870 |

Example 3

Figure 5:
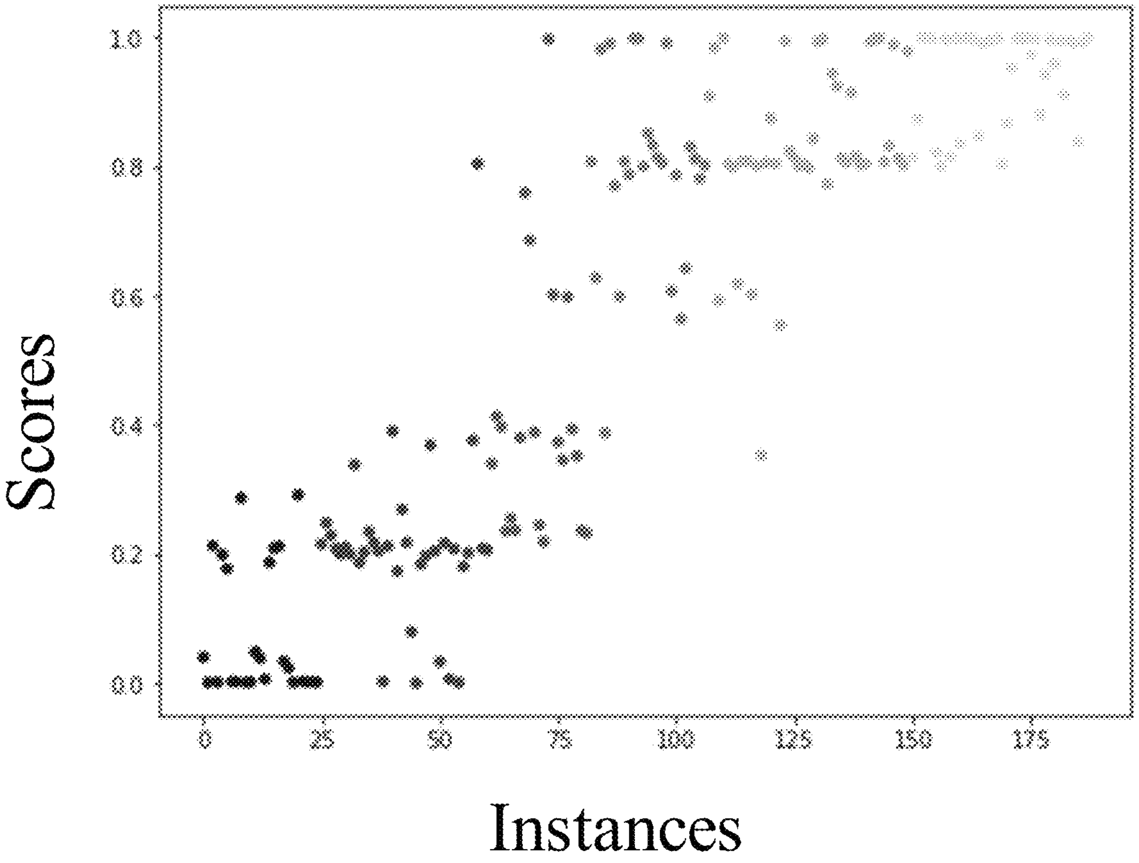
FIG. 5 is a dot plot to illustrate testing results of BI-RADS prediction according the method in example 3.

In example 3, the system (100) according to the first embodiment was applied for evaluating the prediction class assigned to each medical image of the test dataset in terms of preciseness and confidence. Please refer to FIG. 5, the dot plot illustrated testing results of BI-RADS prediction output by the system (100) according to the first embodiment. Each dot represents a specific case sampled from the test dataset and the corresponding prediction score output by the system (100). Corresponding case numbers were described in Table 1d as a confusion matrix when comparing to the ground truth (test dataset).

TABLE 1d

| | BI-RADS Ground Truth | | | | | |
|---|---|---|---|---|---|---|
| BI-RADS prediction | 2 | 3 | 4a | 4b | 4c | 5 |
| 2 | 17 | 6 | 0 | 0 | 0 | 0 |
| 3 | 8 | 25 | 7 | 0 | 0 | 0 |
| 4a | 0 | 4 | 9 | 1 | 1 | 0 |
| 4b | 0 | 0 | 3 | 5 | 4 | 0 |
| 4c | 0 | 1 | 1 | 14 | 24 | 11 |
| 5 | 0 | 0 | 1 | 5 | 14 | 27 |

The prediction scores were highly clustered and the system (100) demonstrated clear and precise medical image classification according to the test dataset generated from the breast cancer nodule images when compared with valid dataset. The accuracy of the BI-RADS prediction result was 95% with mean weighed error of 0.49; among the cases mentioned above, only 2 malignant cases were classified to be benign, while only 6 benign cases were classified to be malignant. The mis-judgement of nodule classification according to standard BI-RADS was minimized by the system (100) disclosed in the present invention.

TABLE 1e

| | Biopsy Ground Truth | |
|---|---|---|
| Predictions | Malignant | Benign |
| Malignant | 101 | 9 (6) |
| Benign | 4 (3) | 74 |

( ): predictions were consistent with BI-RADS ground truth

Please further refer to Table 1e, consistency of BI-RADS prediction with BI-RADS ground truth were further verified, and clearly the results showed high consistency of BI-RADS prediction with biopsy-verified BI-RADS ground truth. In summary, the test results demonstrated high accuracy (0.93), high precision (0.92), high sensitivity (0.96), and high specificity (0.89).

The system (100) after training according to the prediction scores output by the multi-task modeling unit demonstrated high sensitivity and high specificity in BI-RADS prediction, and sub-categorization of the suspicious category 4 reduces risk of mis-judging benign nodules to be malignant.

Accordingly, the present invention demonstrate advantages over the prior arts from several aspects:

1. The system (100) can simulate the judgment process of human interpretation of image classification, and able to clearly distinguish between high-risk lesions and low-risk lesions.
2. The system (100) realizes multi-level accurate classification and judgment functions in ultrasound image analysis.
3. The system (100) is based on feature maps and loss function calculations, which can reduce the amount of calculations required to learn image feature values and achieve fast and effective image analysis and judgment.
4. The system (100) provides a one-click analysis and judgment package to save time of consulting physicians for reading image analysis results.
5. The system (100) can still maintain high-accuracy hierarchical judgments when test datasets are collected from other medical institutions. The system (100) is less affected by dataset variations and is conducive for promotion to medical institutions at all levels.

What is claimed is:

1. A medical image-based system for predicting lesion classification, comprising:

a feature data extracting module for providing a raw feature data based on a medical image; and a predicting module, connecting to the feature data extracting module for outputting a predicted class and a risk index according to the raw feature data, comprising:

a classification unit for generating the predicted class and a prediction score corresponding thereto according to the raw feature data, wherein the predicted class comprises a benign class and a malignant class, and the prediction score comprises a benign score corresponding to a benign class and a malignant score corresponding to the malignant class, wherein a sum of the benign score and the malignant score is 1;

a risk evaluation unit for generating the risk index according to the prediction score, wherein the risk index is computed based on a statistical distribution of the prediction scores, wherein the statistical distribution of the prediction scores is the statistical distribution of the benign score and the malignant score; and a multi-task modeling unit for training the classification unit based on a preliminary prediction class and a preliminary prediction score output by the classification unit according to the raw feature data, wherein the multi-task modeling unit generates an adjusting parameter according to the preliminary prediction class and the preliminary prediction score, wherein:

the preliminary prediction class comprises a benign class or a malignant class, and wherein the preliminary prediction score comprises a first preliminary prediction score, a second preliminary prediction score, a third preliminary prediction score, a fourth preliminary prediction score or a combination of two or more thereof, wherein the multi-task modeling unit comprises:

a first comparing unit for comparing a first prediction class and a first true class so as to output the first preliminary prediction score (L1) according to a first cross entropy loss function of the first prediction class and the first true class, wherein a mathematical formula as follows:

$$L1=\text{CrossEntropy}(\{\text{the benign class}\},\{\text{the malignant class}\}),$$

wherein the first prediction class is the benign class, and the first true class is the malignant class, wherein the benign class comprises a first benign class, a second benign class and a third benign class, and wherein the malignant class comprises a first malignant class, a second malignant class and a third malignant class;

a second comparing unit for comparing a second prediction class and a second true class so as to output the second preliminary prediction score (L2) according to a second cross entropy loss function of the second prediction class and the second true class, wherein a mathematical formula as follows:

$$L2=\text{CrossEntropy}(\{2,3\},\{4a,4b,4c,5\}),$$

wherein the second prediction class is the first benign class and the second benign class, and the second true class is the third benign class and the malignant class; wherein the first benign class is denoted as category 2, the second benign class is denoted as category 3, the third benign class is denoted as category 4*a*, the first malignant class is denoted as category 4*b*, the second malignant class is denoted as category 4*c*, and the third malignant class is denoted as category 5 according to BI-RADS standards;

a third comparing unit for comparing a third prediction class and a third true class so as to output the third preliminary prediction score (L3) according to a third cross entropy loss function of the third prediction class and the third true class, wherein a mathematical formula as follows:

$$L3=\text{CrossEntropy}(\{2,3,4a,4b\},\{4c,5\}),$$

wherein the third prediction class is the benign class and the first malignant class, and the third true class is the second malignant class and the third malignant class; and a fourth comparing unit for comparing a fourth prediction class, a fourth true class, and a reference class so as to output the fourth preliminary prediction score (L4) according to a fourth cross entropy loss function of the fourth prediction class, the fourth true class, and the reference class, wherein a mathematical formula as follows:

$$L4=\text{CrossEntropy}(\{2\},\{3,4a,4b,4c\},\{5\}),$$

wherein the fourth prediction class is the first benign class, the fourth true class is the second benign class, the third benign class, the first malignant class and the second malignant class, and the reference class is the third malignant class; and a regression unit for regression analysis of the preliminary prediction class and outputting a regression score ($L_{regression}$), and the multi-task modeling unit generates the adjusting parameter (L) according to the regression score, the first preliminary prediction score, the second preliminary prediction score, the third preliminary prediction score and the fourth preliminary prediction score, wherein a mathematical formula as follows:

$$L=L_{regression}+L1+L2+L3+L4.$$

2. The system according to claim 1, wherein the medical image is a lesion image comprising ultrasound image, Magnetic Resonance Imaging (MRI) image, X-ray image, Computed Tomography (CT) image, Positron Emission Tomography (PET) image, Single-Photon Emission Computed Tomography (SPECT) image, Mammograhy image, Endoscopic image, fluoroscopy image or nuclear medicine image.

3. The system according to claim 2, wherein the lesion comprises a nodule resulting from breast cancer, lung cancer, thyroid cancer, skin cancer, ovarian cancer, testicular cancer, renal cell carcinoma, pancreatic cancer, colorectal cancer, or lymphoma.

4. A method for predicting lesion classification based on medical image, comprising:

inputting a raw feature data;

outputting a predicted class, a prediction score and a risk index, wherein the prediction score is output corresponding to the predicted class, and the risk index is generated according to the prediction score, wherein the risk index is computed based on a statistical distribution of the prediction scores, wherein the predicted class comprises a benign class and a malignant class, and the prediction score comprises a benign score corresponding to a benign class and a malignant score corresponding to the malignant class, wherein a sum of the benign score and the malignant score is 1, and wherein the statistical distribution of the prediction scores is the statistical distribution of the benign score and the malignant score; and wherein in a pre-train phase, the method further comprises:

outputting a preliminary prediction class and a preliminary prediction score according to the raw feature data, wherein: the preliminary prediction class comprises a benign class or a malignant class, and wherein the preliminary prediction score comprises a first preliminary prediction score, a second preliminary prediction score, a third preliminary prediction score, a fourth preliminary prediction score or a combination of two or more thereof, and outputting an adjusting parameter by running a multi-task model according to the preliminary prediction class and the preliminary prediction score, wherein the running multi-task model comprises:

outputting the first preliminary prediction score (L1) by comparing a first prediction class and a first true class and by calculating according to a first cross entropy loss function, wherein a mathematical formula as follows:

$$L1=\text{CrossEntropy}(\{\text{the benign class}\},\{\text{the malignant class}\}),$$

wherein the first prediction class is the benign class, and the first true class is the malignant class, wherein the benign class comprises a first benign class, a second benign class and a third benign class, and wherein the malignant class comprises a first malignant class, a second malignant class and a third malignant class;

outputting the second preliminary prediction score (L2) by comparing a second prediction class and a second true class and by calculating according to a second cross entropy loss function, wherein a mathematical formula as follows:

$$L2=\text{CrossEntropy}(\{2,3\},\{4a,4b,4c,5\}),$$

wherein the second prediction class is the first benign class and the second benign class, and the second true class is the third benign class and the malignant class; wherein the first benign class is denoted as category 2, the second benign class is denoted as category 3, the third benign class is denoted as category 4*a*, the first malignant class is denoted as category 4*b*, the second malignant class is denoted as category 4*c*, and the third malignant class is denoted as category 5 according to BI-RADS standards;

outputting the third preliminary prediction score (L3) by comparing a third prediction class and a third true class and by calculating according to a third cross entropy loss function, wherein a mathematical formula as follows:

$$L3=\text{CrossEntropy}(\{2,3,4a,4b\},\{4c,5\}),$$

wherein the third prediction class is the benign class and the first malignant class, and the third true class is the second malignant class and the third malignant class;

outputting the fourth preliminary prediction score (L4) by comparing a fourth prediction class, a fourth true class, and a reference class and by calculating according to a fourth cross entropy loss function, wherein a mathematical formula as follows:

$$L4=\text{CrossEntropy}(\{2\},\{3,4a,4b,4c\},\{5\}),$$

wherein the fourth prediction class is the first benign class, the fourth true class is the second benign class, the third benign class, the first malignant class and the second malignant class, and the reference class is the third malignant class;

outputting a regression score ($L_{regression}$) by conducting a regression analysis of the preliminary prediction class; and generating the adjusting parameter (L) according to the regression score, the first preliminary prediction score, the second preliminary prediction score, the third preliminary prediction score and the fourth preliminary prediction score, wherein a mathematical formula as follows:

$$L=L_{regression}+L1+L2+L3+L4.$$

5. The method according to claim 4, wherein the raw feature data is obtained by a method comprising:

inputting a medical image to an encoder-decoder architecture for image feature mapping data; and outputting the image feature mapping data to obtain the raw feature data, wherein the raw feature data comprises a feature map data, a radiomics feature data or a deep learning feature data.

6. The method according to claim 4, wherein the lesion comprises a nodule resulting from breast cancer, lung cancer, thyroid cancer, skin cancer, ovarian cancer, testicular cancer, renal cell carcinoma, pancreatic cancer, colorectal cancer, or lymphoma.

* * * * *